Patented June 5, 1923.

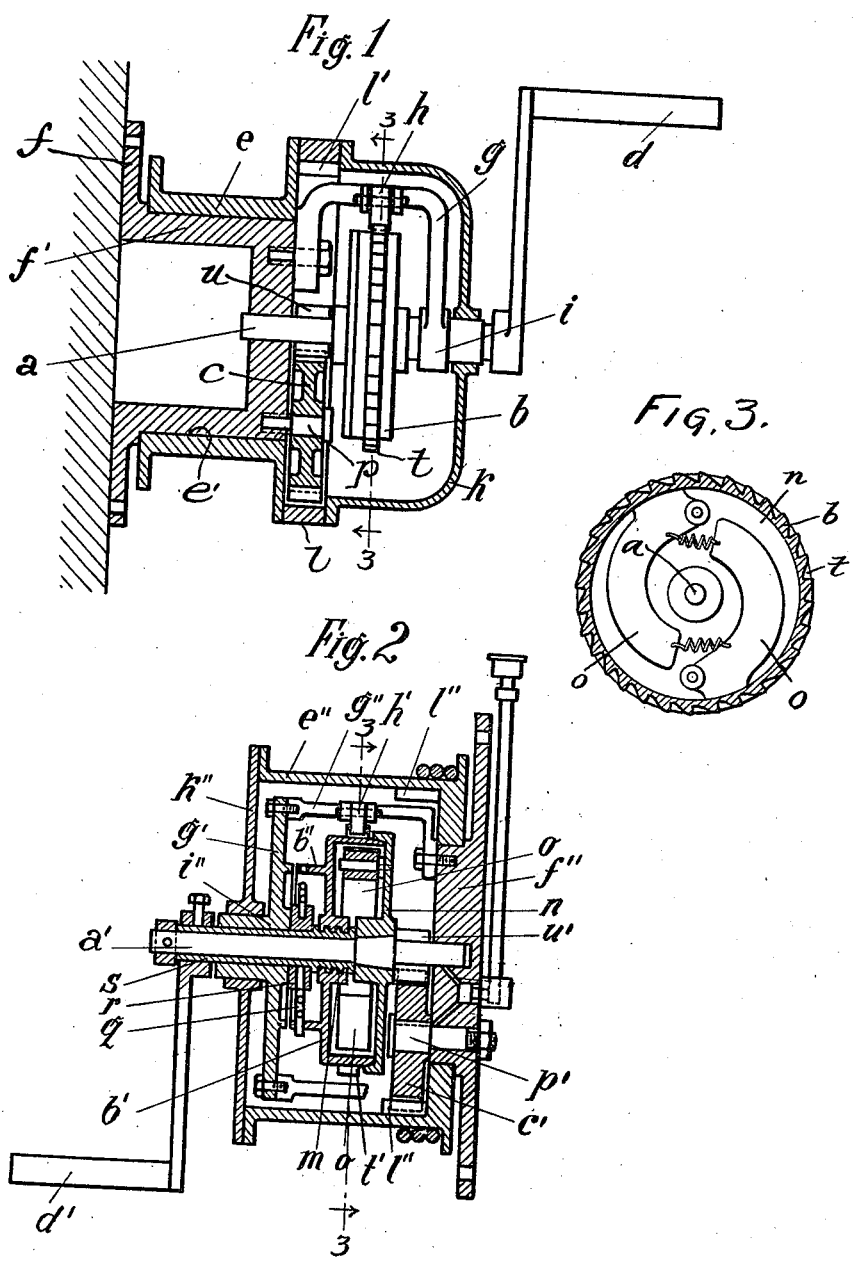

1,457,778

UNITED STATES PATENT OFFICE.

ANTON LANG, OF MUNICH, BAVARIA, GERMANY.

SURETY WINDLASS FOR ATTACHMENT TO WALLS.

Application filed August 9, 1920. Serial No. 402,491.

(GRANTED UNDER THE PROVISIONS OF THE ACT OF MARCH 3, 1921, 41 STAT. L., 1313.)

*To all whom it may concern:*

Be it known that I, ANTON LANG, a subject of the Free State of Bavaria, German Republic, residing at Munich, Bavaria, Germany, Frühlingstrasse 20, have invented certain new and useful Improvements in Surety Windlasses for Attachment to Walls (for which I have filed applications in Austria, February 15, 1920; Czechoslovakia, March 26, 1920; Germany, March 24, 1918, Patent No. 319,124, issued February 25, 1920; and Germany, April 27, 1920, Patent No. 327,301, issued Oct. 9, 1920), of which the following is a specification.

My invention relates to improvements in the construction of windlasses in which a winding reel is mounted to rotate about a wall bracket so that there will be an unobstructed field surrounding the periphery of the reel in order that a cable may be extended therefrom at any desired angle.

In various forms of windlasses at present used, it is the practice to so mount the reel carrying the cable that several supporting arms are found necessary to span the width of the reel itself and then extend radially toward the center to terminate in a bearing adapted to support the outer end of the shaft of the reel. It has also been found desirable to enclose the mechanism operating the reel to exclude grit and dirt from the moving parts and this has been carried out by providing a hollow housing adapted to be held against a wall plate and enclosing the reel and mechanism. An opening is provided in the periphery of the housing to allow the cable to pass through. In both of these constructions, above referred to, it is not possible to extend the winding cable from the reel at any desired angle and it is therefore the object of the present invention to provide a support for a reel, adapted to receive the coils of a cable, from which the cable may be extended at any angle desired.

Further objects of this invention will appear throughout the specification and be clearly pointed out in the appended claims.

The invention is illustratively exemplified in the accompanying drawing: wherein Fig. 1, is a substantially vertical sectional view through one form of the invention; and Fig. 2, is a sectional view of a modified form of the invention showing the operating mechanism housed within the winding reel.

Fig. 3 is a sectional view of the brake mechanism taken on lines 3—3 of Figs. 1 and 2.

Referring to the drawing and especially to Fig. 1, *f* denotes a wall bracket having a raised cylindrical central portion *f'* closed at its outer end and provided with a bearing adapted to receive one end of shaft *a*. The other end of this shaft *a* is supported in a bearing *i* carried by the free end of a substantially U shaped bridge *g* the opposite end of which is attached to the face of the cylindrical raised portion *f'*. A reel or drum *e* adapted to receive the coils of a rope, chain, or cable and having a finished bore *e'* therein to turn about the periphery of the cylindrical portion *f'* is provided with parallel upstanding flanges, the outermost of which is flush with the closed end of the portion *f'* when the reel *e* is in operative position.

Secured to this outer face of the last named flange is an annular ring *l* having its inner periphery provided with gear teeth *l'*. As shown in Fig. 1, these teeth *l'* mesh with the teeth of an idler gear *c* loosely mounted on a pin *p* projecting from the face of the cylindrical portion *f'* and at the opposite side of the shaft *a* from the attached end of bridge *g*. The shaft *a* carries a pinion gear *u* closely adjacent the face of the portion *f'* and in mesh with the gear *c*. Intermediate the pinion *u* and the bearing *i* and mounted on the shaft *a* is a centrifugally operated brake *b* the mechanism of which is more clearly illustrated in Figs. 2 and 3, and comprises an annular wall or flange having its outer surface provided with a series of ratchet teeth *t* adapted to be engaged by a pawl *h* pivoted at one end to the bridge *g*. The open face of the brake flange *b* is operated against a coupling disc *n* which carries the pivoted jaws *o* so that the latter will swing outwardly under the centrifugal force of the revolving disc *n*. The coupling disc *n* is fixed to the shaft *a* which also carries the pinion gear *u* in mesh with the idler gear *c*. In rest position, i. e. when the reel is being wound up, the jaws *o* are drawn inwardly toward each other by the action of the springs *o'*, the opposite ends of the latter being attached to the free ends of the jaws and the pivoted ends thereof. When it is desired to permit the load to descend the reel $e$ rotates rapidly and through the gears $c$ and $u$ and shaft $a$ the coupling disc $n$ revolves with sufficient speed to cause the jaws $o$ to swing outwardly against the inner wall of the brake flange $b$. This operation will force the portion of the jaws adjacent their pivotal ends into engagement with the surrounding wall so that a braking action will take place between jaws themselves and stationary brake drum to reduce the speed of the coupling disc and reel. A housing preferably in the form of a hollow member $k$ is secured at its open end to the outer face of the ring $l$ and completely encloses the entire operating mechanism. An opening located centrally of the closed end of the housing $k$ is adapted to bear loosely about the shaft $a$ and closely adjacent the outer face of the bearing $i$. In order to operate the moving parts to wind the reel $e$ in either direction the shaft $a$ is provided with a crank handle $d$ the hub of which is keyed or otherwise fastened to the outer free end of this shaft.

Referring to the form of the invention illustrated in Fig. 2, it will be noted that the mechanism for operating the parts is mounted within the reel instead of at the front as in Fig. 1. The wall bracket designated $f''$ is but slightly raised at its inner face to provide a circular bearing surface to receive the inwardly directed annular flange on the inner edge of the drum or reel $e''$ the outer edge of which is faced by an annular plate or disc $k''$ having a central opening therein adapted to bear about a bearing $i''$. This bearing $i''$ is an integral part of a stationary annular disc $g'$ supported at the outer ends of standards or bridge pieces $g''$ secured at their other ends to the face of the wall bracket $f''$. Mounted axially of the reel $e''$ and having one end bearing in an opening in the wall bracket $f''$ and its opposite end extending through the bearing $i''$ is a shaft $a'$ provided with a cone shaped enlargement spaced a short distance from its inner end. A sleeve $s$ surrounding the shaft $a'$ and bearing at its outer surface against the inner periphery of the bearing $i''$ is provided with a series of raised threads $m$ at the inner end thereof and adjacent the face of the cone shaped portion of the shaft $a'$. The opposite end of the sleeve $s$ projecting beyond the bearing $i''$ carries a crank handle $d'$ the hub of which is secured to the sleeve by means of a set screw. The portion of the shaft $a'$ extending beyond the cone shaped portion and adjacent the face of the wall bracket $f''$ is provided with a toothed pinion $u'$ keyed thereto and meshing with an idler gear $c'$ loosely mounted on a pin $p'$ projecting from the face of the bracket $f''$. An internally toothed portion $l''$ is provided on the reel $e''$ adjacent the inside bearing flange and is constantly in mesh with the teeth of the idler gear $c'$.

To control the rotary movements of the reel $e''$ a brake casing $b'$ having an internally threaded portion adapted to ride over the threads $m$ of the spindle $s$ is provided with an annular flange extending parallel to the axis thereof; said flange being provided with a continuous series of ratchet teeth $t'$ extending externally about its periphery. In order to prevent rotation of the brake casing $b'$ except in one direction a pawl $h'$ is pivoted on one of the standards $g''$ and engages the ratchet teeth $t'$. The edge of the flange on the brake casing $b'$ is provided with a beveled marginal portion adapted to move into engagement with the flange of a coupling disc $n$ the hub of which is mounted to turn with the cone shaped portion of the shaft $a'$. When the device is in rest position the brake casing $b'$ is held against the coupling disc $n$ by pressure exerted from a coiled flat spring $q$, one end of which is secured to a ring $r$ on the spindle $s$ and the other end of which engages with a portion of an outwardly projecting annular flange $b''$ of the brake casing $b'$. This spring $q$ is intended to rotate the brake casing $b'$ on the screw threads $m$ and in a direction towards the coupling disc $n$ whereby the two members will be normally held together.

As hereinafter more fully described, the lowering operation required to release the parts is effected by reversing the direction of rotation of the handle $d'$, i. e. in a counter clockwise direction, whereupon the brake casing will move axially away from the disc $n$ and the latter will be forced to rotate very rapidly through the gears $c'$ and $u'$ and reel $e''$ the latter being rotated by the unwinding cable. In order to prevent a too rapid counter rotation of the parts the coupling disc $n$ is provided with extensible jaws $o$ which move radially under the centrifugal force of the revolving disc and engage against the inner periphery of the brake casing $b'$; the latter being locked against rotation in a counter direction due to the pawl $h'$ and ratchet teeth $t'$. To further bring about a slowing down of the peripheral speed of the reel $e''$ by more securely fixing the position of the brake casing $b'$ the inner face of the plate $g'$ is provided with a raised annular surface or ring $x$ against which the edge of the flange $b''$ is brought into contact as the latter moves axially away from the disc $n$.

In operation the two forms of the device are controlled in substantially the same manner, but inasmuch as the sectional showing in Fig. 2, is more fully developed reference will be made to this figure in the following: To wind the coils of a cable about the reel $e''$ the crank handle $d'$ will be turned in a clockwise direction whereupon the sleeve $s$ and threads $m$ will move the brake casing axially against the coupling disc $n$ and the latter carried by and fixed to the shaft $a'$ will rotate in the direction of the handle. Thus movement imparted to the shaft $a'$ will likewise rotate the pinion $u'$, gear $c'$ and cause a counter rotation of the reel $e''$ to wind up the coils of the cable. This operation will be continued until it is desired to release the load whereupon a lowering of the cable for a succeeding load is subsequently carried out. This operation is brought about by turning the handle $d'$ in the reverse or counter-clockwise direction a movement which rotates the spindles and moves the brake casing $b'$ over the threads $m$ and away from the coupling disc $n$. In the meantime, however, the pawl $h'$ has held the brake casing from rotation and the engagement of the serrated edges of $b''$ and $x$ has made further movement of casing impossible. Resistance having been removed from the coupling disc $n$ the load at the end of the cable will tend to unwind the latter and at the same time cause the parts to revolve very rapidly. As hereinbefore explained the rapid rotation of the reel $e''$, gears $u'$ and $c'$ is checked and held in control by the action of the jaws $o$ against the stationary brake casing $b'$. To completely check the unwinding of the cable it is simply necessary to turn the handle $d'$ clockwise a slight distance to rigidly engage the brake casing and the coupling disc together.

I claim:

1. In a windlass of the character described, a wall bracket having an annular bearing surface, a reel associated with said bearing surface, operating means carried on the face of said bearing surface and connected to said reel for imparting rotary movement to the latter, a cover member associated with the reel and adapted to cover the said operating means, said operating means being provided with a projecting member adapted to project through an opening in the cover to receive a handle.

2. In a windlass of the character described, a wall bracket having a raised centrally located annular portion, a driving shaft mounted in said raised portion, a bearing for the outer end of said shaft, a reel mounted to rotate about said raised annular portion, a gear carried by the shaft, gear mechanism carried by said raised portion of the wall bracket and in mesh with said first named gear, teeth integral with the said reel and adapted to mesh with said gear mechanism, and a cover member associated with the reel and having an opening therein to embrace the bearing about the shaft.

3. In a windlass of the character described, a wall bracket having an annular bearing surface, a reel associated with said bearing surface, means for rotating said reel in one direction, comprising a shaft mounted axially of the bracket and connected to said reel, and a clutch mechanism carried by said shaft and adapted to impart rotary movement thereto when operated in one direction and to permit free rotary movement of the reel and shaft when rotated in the opposite direction.

4. A windlass, as claimed in claim 3, in which the clutch mechanism comprises a sleeve carried by the shaft and having a spiral thread at one end, a movable clutch member mounted on said thread of said sleeve, and a second clutch member fixed to the shaft and adapted to be engaged by the movable member when the sleeve is being driven in one direction, substantially as described.

5. A windlass, as claimed in claim 3, in which the clutch mechanism comprises a sleeve carried by the shaft and having a spiral thread at one end, a movable clutch member mounted on said thread of the sleeve, a second clutch member fixed to the shaft, a handle for rotating the sleeve, means carried by the said bracket for supporting the outer end of the sleeve, and means disposed between the last means and the movable clutch member for locking the latter against movement in one rotary direction, substantially as described.

6. A windlass, as claimed in claim 3, in which the clutch mechanism comprises a clutch member movable axially of said shaft, means for driving the said member in one rotary direction, a second clutch member carried by the shaft and adapted to be engaged by the first clutch member, and brake members carried by the second clutch member and centrifugally operated to engage the second member and brake the rotary speed of the first member when the latter is being operated by the unwinding action of the reel, the first clutch member being provided with means to engage a fixed part of the device to prevent rotary movement thereof subsequently to an axial movement to release the two clutch members, substantially as described.

In testimony whereof I affixed my signature in presence of two witnesses.

ANTON LANG.

Witnesses:
PAUL DREY,
ANNA NIEDERMAICI.